Jan. 15, 1929.
S. D. LOCKE
1,699,400
CHAIN LINK
Filed May 31, 1924
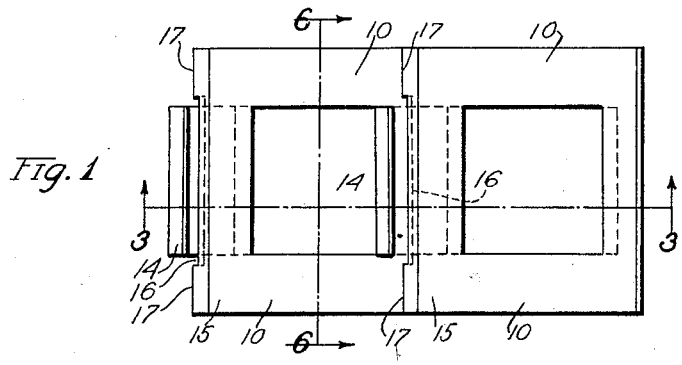
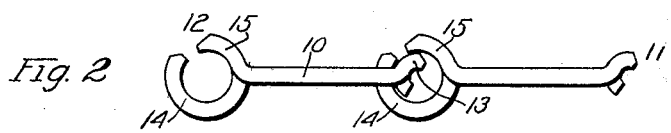
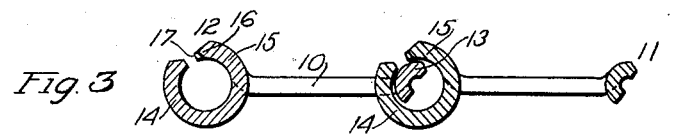
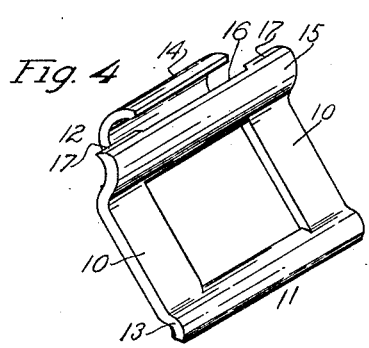
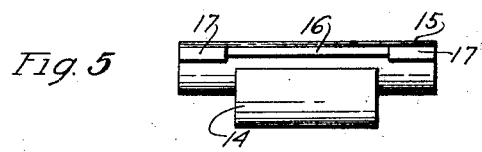
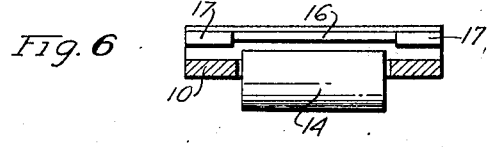
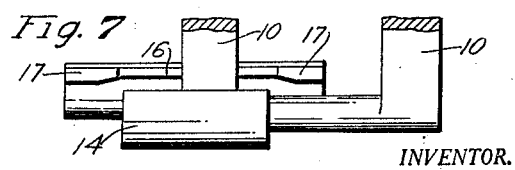
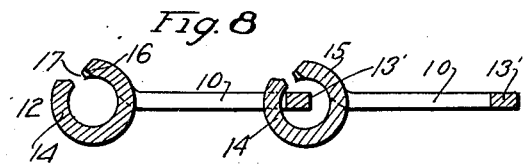
INVENTOR.
Sylvanus D. Locke.
BY
G. H. Braddock
ATTORNEY.

Patented Jan. 15, 1929.

1,699,400

UNITED STATES PATENT OFFICE.

SYLVANUS D. LOCKE, OF BRIDGEPORT, CONNECTICUT.

CHAIN LINK.

Original application filed March 7, 1923, Serial No. 623,435. Divided and this application filed May 31, 1924. Serial No. 716,994.

This application is a division of my pending application, Serial No. 623,435, filed March 7, 1923.

The invention herein relates to sheet metal chain links, and presents a chain link which is an improvement upon the link of the invention of Osswald, disclosed and patented in his Letters Patent of the United States No. 1,107,931, granted August 18, 1914, and No. 1,157,175, granted October 19, 1915.

One of the objects of the invention is to provide a novel chain link which will be a great improvement over chain links of the same general character heretofore known.

Each of the duplicate chain links illustrated and described in the patents to Osswald, above identified, consists, generally, of side bars, a relatively small end bar, and a relatively small end bar of a different link relatively large end bar or end hook of a link being adapted to be formed around the relatively small end bar of a different link in the assembling operation of links to produce chain. That is to say, the links of the Osswald chain are similar and each connection or joint between said links is constituted by a sprocket or large end bar of one link encircling or enveloping a small end bar of a different link. The sprocket or large end bar consists of a short, relatively wide lip and a long, relatively narrow lip, the former being approximately the width of a link and the latter being of a width to enter the space between the side bars of a link. The ends of said wide and narrow lips of said sprocket or large end bar are spaced apart a predetermined distance or amount, viz, less than the measurement representing the thickness of the metal of which the links are composed. Obviously, the space between the ends of the sprocket bar can not be equal to or greater than the thickness of the metal composing the links, or the links might have relative transverse movement to become accidentally disassembled when the chain is in use. The thickness of the strip of metal from which links such as Osswald's are made necessarily varies, and the distance between the ends of the lips of the sprocket bar must, therefore, be an appreciable amount less than the measurement representing the mean thickness of the strip. When it is desired to remove the Osswald link from a strand of chain, it is necessary to arrange adjacent links so that the side bars of one link are in alinement with the space between the ends of the lips of the sprocket or large end bar of a different link and to then hammer the link to be removed until a side bar has moved transversely of said different link through the whole length of the space between the ends of said lips of the sprocket bar. Naturally, some considerable force is required to thus detach a link, (for example, a broken or impaired link), from chain, not to mention the time necessarily consumed in removing the link.

Another object of the invention is, therefore, to provide a novel chain link having a detaching slot and keepers, whereby links of a chain can be easily disassembled from or manually assembled with other links when this is expedient or desirable.

More specifically, the invention aims to provide a chain link having a small end bar and a sprocket or large end bar adapted to encircle a small end bar of a different link when assembled to produce a strand of chain, the sprocket or large end bar having free, spaced apart ends and one of said ends having a slot intermediate its extremities, whereby the link, when assembled, is insured against accidental displacement, but is capable of being much more readily and easily removed from or manually attached to another link than is a link constructed as illustrated and described in the Osswald patents mentioned.

In chains having links of the nature of those of the Osswald patents the stress on the sprocket or large end bar of each link, when in use, is against the long, narrow lip of said bar, and, consequently, the cross section of metal in said long lip, particularly at and adjacent to the end thereof, should be as great as possible, but the short, wide lip of said sprocket or large end bar, is under practically no stress when the chain is in use. I have, therefore, illustrated chain links of the general nature of those of the Osswald patents and have provided the end of the short, wide lip of the sprocket bar of each link with a detaching slot, the material of said wide lip end adjacent the extremities of the slot being spaced from the plane of the end of the long lip of the sprocket bar a distance a little less than the measurement representing the mean thickness of the metal of which the links are composed to constitute detaching keepers for insuring the assembled relation of each sprocket bar or one link with a small end bar of a different link. I desire it understood, however, that the novel link of the present invention could be of modified form, all as will hereinafter fully appear, within the spirit of the present invention. I have preferred to disclose a detaching slot which is a trifle longer than a measurement representing the length of the long lip of the sprocket bar, but the length of the slot may be varied to suit conditions.

Other objects of the invention will be obvious from the drawings and description of the link embodying the invention which I have herein selected for the purpose of illustration.

Fig. 1 is a bottom plan view of a pair of assembled novel links in which the features of the invention are incorporated;

Fig. 2 is an edge view looking toward the bottom edge of Fig. 1;

Fig. 3 is a sectional view on line 3—3 in Fig. 1;

Fig. 4 is a perspective view of the novel link of the invention;

Fig. 5 is an end view of the link of Fig. 4 looking toward the large end of said link;

Fig. 6 is a sectional view on line 6—6 in Fig. 1;

Fig. 7 is a sectional view corresponding with the showing of Fig. 6, disclosing the links as when being disassembled or manually assembled; and Fig. 8 is a sectional view corresponding with the showing of Fig. 3, disclosing a modified form of chain link.

In the drawing, I have disclosed a pair of duplicate links having the features of the invention. Of each of these links, 10 denotes side bars, 11 the small end bar, and 12 the sprocket or large end bar or end hook.

The small end bar, as shown, is of general curvilinear conformation, as indicated at 13, and the sprocket or large end bar consists of the long, relatively narrow lip 14 struck from the blank to define the side bars, and the short relatively wide lip 15 constituting the end portion of the link. The lips 14, 15 are of general curvilinear conformation, preferably together defining a broken cylinder or tube adapted to envelope or encircle the small end bar 13.

The free ends of the sprocket bar, i. e., the ends of the short, wide lip 15 and the long, narrow lip 14, are spaced apart a distance a little less than a measurement representing the mean thickness of the metal composing the links, and the end of the relatively wide lip 15 is provided with the centrally positioned detaching slot 16, desirably having length about equal to or slightly greater than the width of the long, relatively narrow lip 14, defining the detaching keepers 17 at the extremities of said slot.

The detaching slot 16 can be of any preferred depth and shape, and can be shorter or longer than shown. It is preferably of a depth which added to the distance between the ends of the lips of the sprocket or large end bar equals a measurement a trifle greater than or approximately equal to the probable maximum thickness of the sheet metal of which the duplicate links of a chain are composed.

In Fig. 8 I have disclosed a pair of duplicate links which are different from the links of Figs. 1 to 7 in one particular only, viz, the small end bar 13' of each of these links is flat.

The long, narrow lip 14 of one link, as clearly disclosed, enters the space between the side bars 10 of a different link when the links are assembled, and the short, wide lip 15 lies adjacent to or contiguous with the small end bar 13 or 13', as the case may be.

The manner in which a link constructed as illustrated and described can be removed from a strand of chain having similar links is best disclosed in Fig. 7. The side bars of the link the small end of which is shown joined are first arranged to be in alinement with the space between the detaching keepers 17 and the end of the long, narrow lip 14, and the link to be disjoined is then hammered or otherwise manipulated transversely of the adjoining link until one of its side bars has passed a detaching keeper 17. This side bar can then be freely moved through the length of the detaching slot 16, as will be understood, and can afterwards be moved past the other detaching keeper 17. Obviously, but one side bar must pass the keepers when two links are given relative transverse movement, the other side bar always being free of the keepers at the commencement of the relative transverse movement.

But a single hammer blow would, evidently, be required to remove a side bar past each keeper, if in fact even this much force would be necessary, it being apparent that the links can be shifted relatively to each other so that a side bar being forced past the keepers can have relation to the end of the long, narrow lip of the sprocket bar and detaching keepers other than the parallel relation necessary when removing a side bar in the instance of a link such as Osswald's. That is to say, the present links can be positioned relatively to each other to arrange a side bar to be removed at an oblique angle to the free end of the long, narrow lip and the free end of a detaching keeper to be passed, the depth of the detaching slot added to the distance between the ends of the sprocket bar allowing for this oblique arrangement, and manipulated past said free ends without any considerable difficulty, more or less difficulty depending upon the distance between the detaching keepers and the free end of the long, narrow lip relatively to the thickness of the metal of the link, and also depending upon the length of the detaching slot relatively to the width of the long, narrow lip. To manually replace a link the operations described are reversed.

Whereas, considerable and continuous force is required to remove from a strand of chain or manually replace in said strand a link constructed as illustrated and described in the Osswald patents, hereinbefore identified, the link of the present invention can be readily and quickly removed from or manually replaced in a strand by the expenditure of but a small amount of effort. At the same time, the novel link fully illustrated and described is no more liable than the Osswald link to become accidentally displaced from chain when in use.

Many alterations in the construction, and many apparently widely differing embodiments and applications of the invention will suggest themselves to those skilled in the art of making sheet metal chain links, without departing from the scope and spirit thereof. The disclosure and description herein are purely illustrative, and are not intended to be in any sense limiting.

What I claim is:

A sheet metal chain link comprising a body and end bars one of which is a sprocket bar including a relatively narrow and a relatively wide lip, said lips having their ends spaced apart a distance less than the measurement representing the thickness of said sheet metal, said relatively wide lip end having a detaching slot intermediate its extremities defining keepers adjacent the extremities of said relatively narrow lip end, and said detaching slot having depth which added to the measurement representing the distance between the ends of said elements equals a measurement greater than that representing the thickness of said sheet metal.

Signed at Bridgeport, in the county of Fairfield, and State of Connecticut, this 27th day of May, A. D. 1924.

SYLVANUS D. LOCKE.

CERTIFICATE OF CORRECTION.

Patent No. 1,699,400. Granted January 15, 1929, to

SYLVANUS D. LOCKE.

It is hereby certified that error appears in the printed specification of the above numbered patent requiring correction as follows: Page 1, line 9, for "No. 1,107,931" read "1,107,831"; same page, line 19, strike out the words "relatively small end bar of a different link", and line 20, after the word "hook" insert a comma and the words ", the relatively large end bar or end hook"; and that the said Letters Patent should be read with these corrections therein that the same may conform to the record of the case in the Patent Office.

Signed and sealed this 19th day of February, A. D. 1929.

(Seal)

M. J. Moore,
Acting Commissioner of Patents.